US008122490B2

(12) United States Patent
Campbell et al.

(10) Patent No.: US 8,122,490 B2

(45) Date of Patent: Feb. 21, 2012

(54) TRANSFER SERVER OF A SECURE SYSTEM FOR UNATTENDED REMOTE FILE AND MESSAGE TRANSFER

(75) Inventors: Eric Campbell, Rye, NH (US); Robert F Hoffman, Auburndale, NY (US); Robert Maloney, Jr., Massapequa Park, NY (US); Maris N Lemanis, Smithtown, NY (US)

(73) Assignee: Bottomline Technologies (de), Inc, Portsmouth, NH (US)

(*) Notice: Subject to any disclaimer, the term of this patent is extended or adjusted under 35 U.S.C. 154(b) by 227 days.

(21) Appl. No.: 12/460,936

(22) Filed: Jul. 27, 2009

(65) Prior Publication Data

US 2009/0293107 A1 Nov. 26, 2009

Related U.S. Application Data

(63) Continuation of application No. 10/879,233, filed on Jun. 29, 2004, now Pat. No. 7,568,219, which is a continuation-in-part of application No. 10/139,596, filed on May 6, 2002, now abandoned.

(51) Int. Cl.
*G06F 7/04* (2006.01)

(52) U.S. Cl. ........................................ 726/5; 726/4

(58) Field of Classification Search ...... 726/5; 713/168; 709/219, 229

See application file for complete search history.

(56) References Cited

U.S. PATENT DOCUMENTS

| | | | | |
|---|---|---|---|---|
| 5,295,256 | A | 3/1994 | Bapat | |
| 5,440,744 | A | 8/1995 | Jacobson | |
| 5,619,710 | A | 4/1997 | Travis | |
| 5,689,565 | A | 11/1997 | Spies | |
| 6,052,785 | A | 4/2000 | Lin | |
| 6,104,798 | A | 8/2000 | Lickiss | |
| 6,594,692 | B1 | 7/2003 | Reisman | |
| 6,757,710 | B2 | 6/2004 | Reed | |
| 6,952,737 | B1 | 10/2005 | Coats | |
| 6,954,632 | B2 * | 10/2005 | Kobayashi | 455/411 |
| 6,961,849 | B1 | 11/2005 | Davis | |
| 7,003,781 | B1 | 2/2006 | Blackwell | |
| 7,085,840 | B2 | 8/2006 | De Jong | |
| 7,133,845 | B1 | 11/2006 | Ginter | |
| 7,233,997 | B1 | 6/2007 | Leveridge | |
| 7,284,036 | B2 | 10/2007 | Ramaswamy | |
| 2002/0124137 | A1 * | 9/2002 | Ulrich et al. | 711/113 |
| 2002/0184054 | A1 | 12/2002 | Cox | |
| 2002/0184349 | A1 | 12/2002 | Manukyan | |
| 2003/0101446 | A1 | 5/2003 | McManus | |
| 2005/0138186 | A1 | 6/2005 | Hesselink | |
| 2006/0031407 | A1 | 2/2006 | Dispensa | |
| 2006/0168023 | A1 | 7/2006 | Srinivasan | |

* cited by examiner

*Primary Examiner* — Samson Lemma

(74) *Attorney, Agent, or Firm* — Timothy P. OHagan

(57) ABSTRACT

A method for automatically transferring a data file from a network drive of a client controlled local area network to a transfer server over the Internet comprises using a first workstation to configure event parameters within event tables of the transfer server. An unattended interface module executed by a processor of a second workstation obtains, from the transfer server, the event parameters stored in the event tables. The event parameters comprise a file name and a directory path. The file name identifies the data file to be uploaded. The directory path identifies an upload directory of the network drive. The second workstation periodically searches the upload directory and, upon locating a data file in the upload directory with the file name, transfers the data file to the transfer server over a secure connection established with the transfer server over the internet.

6 Claims, 17 Drawing Sheets

User ID 314

| Index 360 | Transfer Client ID 362 | | Password 358 | Interval 364 | Session Time 366 | Alert Instruction 367 | Session ID 368 | Status Field 369 |
|---|---|---|---|---|---|---|---|---|
| | User Group ID 354 | User ID 356 | | | | | | |
| | Group ID 71 | User ID 72 | Encrypted Password 82 | Time Interval 78 | Time Stamp 93 | Notification Address 79 | Session ID 83 | T |
| | | | | | | | | F |
| | | | | | | | | |
| | | | | | | | | |
| | | | | | | | | |

352

Event Key Table 311

| Index 360 | Transfer Client ID 362 | | Event Key 315 |
|---|---|---|---|
| | Group ID 354 | User ID 356 | |
| | Group ID 71 | User ID 72 | Event Key Value 80 |
| | | | |
| | | | |
| | | | |
| | | | |
| | | | |
| | | | |
| | | | |
| | | | |

313

Figure 5a

310

Event Parameter Table 316

| Event Key 315 | Parameter ID 321 | Parameter Value 322 |
|---|---|---|
| Event Key Value 80 | | |
| | | |
| | | |
| | | |
| | | |
| | | |
| | | |
| | | |
| | | |

320

Figure 5b

| Event Parameter Table 316 | | |
|---|---|---|
| Event Key 315 | Parameter ID 321 | Parameter Value 322 |
| 001 | File Name 323 | |
| 001 | Upload Directory Path 324 | |
| 001 | BLOB Handling 326 | |
| 001 | Destination Group ID 325 | |
| 001 | BLOB Loading Rules 327 | |
| 001 | Status 328 | |
| | Email Address 101 | |
| | Email Code 102 | |
| | | |

320

Figure 5c

| Event Parameter Table 316 | | |
|---|---|---|
| Event Key 315 | Parameter ID 321 | Parameter Value 322 |
| 002 | File Name 342 | |
| | Download Directory Path 343 | |
| | Event Type 344 | |
| | BLOB Generation 345 | |
| 002 | Profile ID 347 | |
| | Extract Rules 349 | |
| | Class 351 | |
| | Offset 353 | |
| | Status 355 | |
| | Printer 359 | |
| | Print Code 357 | |
| | Email Address 101 | |
| | Email Code 102 | |

320

Figure 5d

| Email Codes 102 | |
|---|---|
| Code | Description |
| 01 | No Email Notification |
| 02 | Send on Success |
| 03 | Send on Failure |
| 04 | Send on Success or Failure |

100

Figure 6

| Available Printers 318 | | | |
|---|---|---|---|
| Index | Group ID 354 | User ID 356 | Printer ID 378 |
| | | | Printer ID 81 |
| | | | |
| | | | |
| | | | |

374

Figure 7

| Transfer Methods 51 | Parameters |
|---|---|
| Check Status | User Group, User ID |
| Log On | User Group, User ID, Password |
| Get Password | Session ID |
| Send Printers | Session ID, Printers IDs |
| Retrieve Active Event Keys | Session ID |
| Read Event | Session ID, Event Key |
| Update Event | Session ID, Event Key, Status Information, Offset |
| Create BLOB | Session ID, Profile ID, Extract Rules |
| Check for Available BLOB | Session ID, Class, Offset |
| Download BLOB | Session ID, BLOB ID |
| Upload File | Session ID, File Name, BLOB Contents |
| Set Destination BLOB Owner | Session ID, BLOB ID, User Group |
| Process BLOB | Session ID, BLOB ID, Loading Rules |

Figure 8

(Check Status)

(Log On)

(Get Password)

(Send Printers)

(Retrieve Active Event Keys)

(Read Event)

(Update Event)

(Create BLOB)

(Check for Available BLOB)

(Download BLOB)

(Upload File)

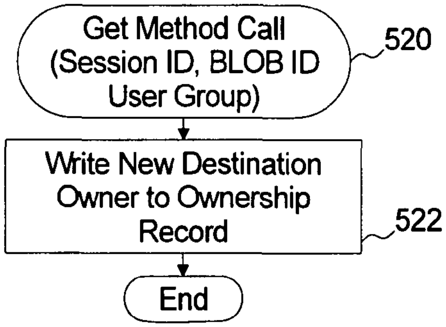
Figure 20
(Set Destination BLOB Owner)
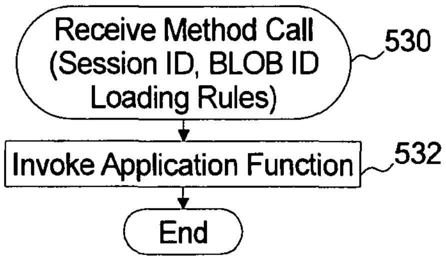
Figure 21
(Process BLOB)
Ownership Table 62
| Index | BLOB ID Field 85 | Class Field 86 | Destination Group ID Field 87 | Offset Field 88 |
|---|---|---|---|---|
| | BLOB ID 89 | Class Value 90 | Destination Group ID 91 | Offset Table 92 |
| | | | | |
| | | | | |
| | | | | |
| | | | | |
| | | | | |
63
Figure 22

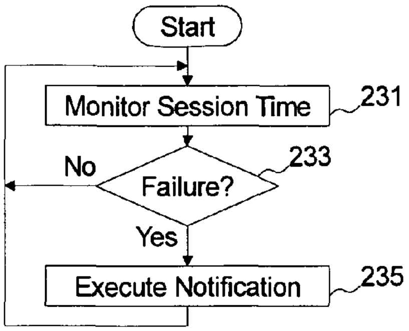

Figure 23

| Local Processes 23 | | |
|---|---|---|
| Index | Process | Parameters |
| 1 | Check Status | User Group, User ID, Password |
| 2 | Session ID | User Group, User ID, Password |
| 3 | Get Password | Session ID |
| 4 | Send Printers | Session ID, Printers IDs |
| 5 | Retrieve Active Event Keys | Session ID |
| 6 | Read Event | Session ID, Event Key |
| 7 | Update Event | Session ID, Event Key, Status Information, Offset |
| 8 | Create BLOB | Session ID, Profile ID, Extract Rules |
| 9 | Check for Available BLOB | Session ID, Class, Offset |
| 10 | Download BLOB | Session ID, BLOB ID |
| 11 | Upload File | Session ID, File Name, BLOB Contents |
| 12 | Set Destination BLOB Owner | Session ID, User Group |
| 13 | Process BLOB | Session ID, BLOB ID, Loding Rules |
| 14 | Save Password | Password |
| 15 | Create and Write File | File Name |
| 16 | Read File | File Name |
| 17 | Send to Printer | Printer ID, File Name |
| 18 | Rename File | Old File Name, New File Name |

Figure 24

Audit Table 312

| Index | TC ID 24 | Date 341 | Time 346 | Method Called 348 | Parameters Passed 350 |
|---|---|---|---|---|---|
| | | | | | |
| | | | | | |
| | | | | | |
| | | | | | |
| | | | | | |
| | | | | | |

342

Figure 28

TRANSFER SERVER OF A SECURE SYSTEM FOR UNATTENDED REMOTE FILE AND MESSAGE TRANSFER

CROSS REFERENCE TO RELATED APPLICATIONS

The present application is a continuation of U.S. patent application Ser. No. 10/879,233 filed on Jun. 29, 2004 which is a continuation in part of U.S. patent application Ser. No. 10/139,596 filed May 6, 2002.

TECHNICAL FIELD

The present invention relates to the exchange of data files over an open network, and more particularly, to a secure system and method for the automated exchange of data files with a web server.

BACKGROUND OF THE INVENTION

Database systems have long been used by businesses to record their commercial interactions with customers, vendors, financial institutions, and other third parties. Most database applications are transaction based—meaning that the application obtains all required data for a particular transaction before the transaction is written to the database.

Since the early days of database systems, it has long been a goal to automate the transfer of data between the business's computer systems and those of the other third parties. Early methods of transferring data between data base systems included exporting data (in accordance with a defined report) from a first system onto a magnetic tape or other data media. The data media is then physically transferred to a second system. While such a system was an improvement over manual entry of data, several draw backs existed. First, physical transfer of the data media could take a significant amount of time if mail or courier was used. Secondly, the three steps of writing the data file to the data media, transferring the data media, and loading the data file from the data media all required human intervention to be properly performed. Thirdly, both the application on the first system and the application on the second system had to be compatible—or, stated another way, the data file written to the data media by the first system had to be in a format that could be read and loaded into the second system.

Development of modems, value added networks (VAN), and Internet networking in general significantly improved the data transfer process. Rather than physically transferring a data file on magnetic tape or other data media, the data file could be transferred using a dial up connection between the two computer systems, a VAN connection, or an Internet connection.

Using a dial up connection, a modem associated with the first system could dial and establish a PSTN telephone line connection with a modem associated with the second system. An operator would be able to export the data file from the first system, transfer the data file to the second system over the PSTN connection, and an operator of the second system could load the data file into the second system.

A VAN connection is quite similar to a dial-up connection with the exception that the PSTN connection is continually maintained (e.g. a leased line) for security. Transfer of a data file between the first system and the second system over a VAN may include the operator of the first system exporting the data file, transferring the data file to the second computer system over the VAN, and an operator of the second system loading the data file into the second system.

Subsequent development of the Internet and secure file transfer systems such as the Secure File Transfer Protocol (SFTP) has made dial up connection and VAN technology obsolete for most data transfer application. Utilizing the Internet and SFTP technology, the operator of the first computer system would export the data file, log onto the SFTP server (that is networked to the second computer system), and upload the file to the SFTP server. The operator of the second computer system would then retrieve the file from the SFTP server and load the file into the second computer system.

While transferring of files using dial up connections, VAN connections, and FTP file transfer are a significant improvement over use of magnetic media for transferring data file, the two systems must still be compatible and human intervention is still required for the file transfer.

A separate field of technology known as web services is being developed to support platform independent processing calls over the Internet. Web Services are data processing services (referred to as methods) which are offered by a servicing application to a requesting application operating on a remote system.

The system offering the web services to requesting systems publishes a Web Service Description Language (WSDL) document which is an Extensible Markup Language (XML) document that describes the web service and is compliant with the Web Services Description Language (WSDL) protocol. The description of the web service may include the name of the web service, the tasks that it performs, the URL to which the method requests may be sent, and the XML structure and parameters required in a method request.

To obtain a published service, the requesting application sends a method call to the system as a Simple Object Access Protocol (SOAP) message within an HTTP wrapper. The SOAP message includes an XML method call which conforms to the required structure and parameters. So long as each system can build and interpret the XML data within the SOAP message within the HTTP wrapper, no compatibility between the two systems is required.

Web services enable applications to be written which request data from the web service providers. For example, a web server which provides stock quotes may publish the structure and parameters for requesting a stock quote, the method call may be required to include the ticker symbol corresponding to the requested quote. Such known web service systems are optimized for a web server system which provides information to a requesting application in response to receiving a method call for a method which the web service systems publishes as available.

Web service systems are optimized for unattended transfer of XML method calls and responses between a system and a web service provider. However, data transfer between a database system of a business and its third parties still is typically performed by exporting a transaction file, transferring the transaction file, and loading the transaction file at the second system—all steps that are facilitated by human intervention.

At the most general level, what is needed is a solution that enables unattended transfer of files over an open network, such as the Internet, between two unattended applications, each operating on remote and secure network systems. More specifically, what is needed is a solution that enables unattended transfer of files over an open network that does not suffer the difficulties and complications that would be encountered if attempting to configure and operate known Internet FTP systems.

SUMMARY OF THE INVENTION

A first aspect of the present invention is to provide a transfer client system for exchanging files with a transfer server over an open network. The transfer client system comprises: i) an upload directory for storing files for subsequent transfer to the transfer server, ii) an authentication registry securely stores authentication credentials, and iii) a transfer client.

The transfer client periodically sends a log-on message to a remote transfer server over a secure transport protocol logical connection established over the open network. The log-on message includes the authentication credentials. In response, the transfer client receives a session ID from the remote transfer server.

The transfer client sends a read event message to the remote transfer server over a secure transport protocol logical connection established over the open network. The read event message includes the Session ID obtained from the remote transfer server.

In response, the transfer client receives event parameters associated with the event. The event parameters may be structured as XML tagged data. The event parameters include identification of a file name, identification of an upload directory path, and a file handling instruction indicating one of data processing by the remote transfer server and messaging to a second system. The parameters further include loading rules if the file handling instruction indicates data processing by the remote transfer server. The parameters further include a destination client ID if the file handling instruction indicates messaging to a second system.

The transfer client sends an upload message to the remote transfer server over a secure transport protocol logical connection established over the open network upon locating a file matching the file name in the upload directory. The upload message comprises the session ID and the binary contents of the file.

The transfer client further provides a file handling message to the remote transfer server over a secure transport protocol logical connection established over the open network.

The file handling message includes the loading rules and an instruction for calling a local process executed by the remote transfer server for loading data from the file into an application database in accordance with the loading rules if the file handling instruction indicates data processing by the remote transfer server.

The file handling message includes the destination client ID and an instruction for calling a local processes executed by the remote transfer server to write the destination client ID to a field of an ownership table whereby the second system may subsequently locate the record in the ownership table and retrieve the binary contents—if the file handling instruction indicates messaging to a second system.

For a better understanding of the present invention, together with other and further aspects thereof, reference is made to the following description, taken in conjunction with the accompanying drawings, and its scope will be pointed out in the appended claims.

BRIEF DESCRIPTION OF THE DRAWINGS

FIG. 5*a* is table representing an exemplary event key table in accordance with one embodiment of the present invention;

FIGS. 5*b*-5*d* are tables representing an exemplary event parameter table in accordance with one embodiment of the present invention;

FIG. 6 is a table representing exemplary email codes in accordance with one embodiment of the present invention;

FIG. 7 is a diagram representing an exemplary available printers table in accordance with one embodiment of the present invention;

FIG. 8 is a table representing exemplary transfer methods operated by the transfer server in accordance with one embodiment of the present invention;

FIGS. 9 through 21 represent operation of an exemplary transfer method operated by the transfer server in accordance with one embodiment of the present invention;

FIG. 22 represents an ownership table in accordance with one embodiment of the present invention;

FIG. 23 represents an exemplary session ID monitoring process operated by the transfer server in accordance with one embodiment of the present invention;

FIG. 24 is a table representing exemplary local processes operated by the transfer client in accordance with one embodiment of the present invention;

FIG. 28 is a table representing an audit table in accordance with one embodiment of the present invention;

DETAILED DESCRIPTION OF THE INVENTION

Figure 1:
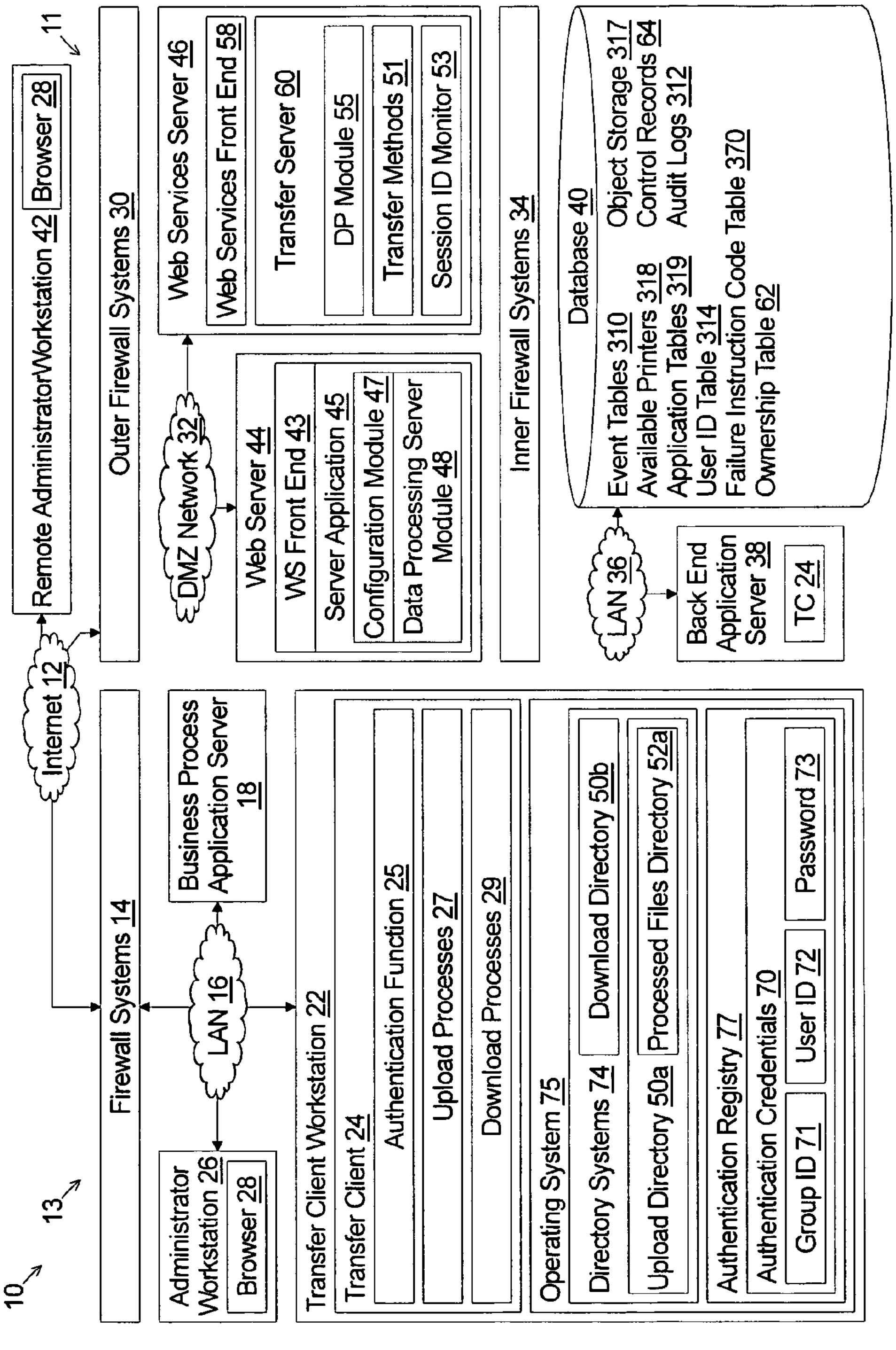
FIG. 1 is a block diagram of a system for secure and unattended file transfer in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

FIG. 1 illustrates exemplary architecture of a system for secure and unattended remote file transfer 10 (e.g. the remote file transfer system) over an open network such as the Internet 12 in accordance with one embodiment of the present invention. The remote file transfer system 10 comprises at least one host system 11 and at least one client system 13—each of which is coupled to the Internet 12.

Overview of Host System

The host system 11 comprises at least one web server 44, a web services server 46, a database 40, and (optionally) a back end application server 38. In the exemplary embodiment, the web server 44 and the web services server 46 are coupled to an IP compliant network typically referred to as a DMZ network 32—which in turn is coupled to the Internet 12 by outer firewall systems 30 and coupled to an IP compliant local area network 36 by inner firewall systems 34. The web server 44 and the web services server 46, may be operated on the same hardware server within the DMZ. The database 40 and the back end application server 38 may be coupled to the local area network 36.

The web server 44 comprises a known web server front end 43 and a server application 45. The server application 35 comprises a data processing services module 48 and a configuration module 47.

The data processing services module 48 may be a menu driven application that, in combination with the web server front end 43, provides sequences of web pages to a remote client system to enable an operator of the remote client system to exchange business process and/or financial transaction data between the operator's business and the business controlling the host system 11. More specifically, the web pages provide data from application tables 319 of the database 40 and obtain data from the operator for writing to the application tables 319 in accordance with the business processes coded or configured into the data processing server module 48.

For example, if the business controlling the host system 11 is a financial institution, the data processing server module 48 may provide web pages which enable the operator to obtain reports and implement transactions typically provided by systems known as "Treasury Work Stations". If the business controlling the host system 11 is a corporate entity providing goods or services, the data processing server module may provide web pages which enable the operator to post invoices, adjust invoices, post payments, request credit memos, and exchange other business process and financial data between the two entities accounting and/or resource management systems.

The configuration module 47 may be a menu driven application that, in combination with the web server front end 43, provides sequences of web pages to a remote client system to enable an operator of the remote client system to configure remote transfer of files between the web services server 46 and a transfer client workstation 22 of the client system 13. A more detailed discussion of the configuration module 47 and its operation is included herein.

The web services server 46 may comprise a web services front end 58 and a transfer server 60.

The web services front end 58 may be a known web services front end which utilizes the simple object access protocol (SOAP) for exchanging XML messages with remote systems (and in particular a transfer client 24 operating on the transfer client workstation 22) using secure socket connections (e.g. SSL Connections) over the Internet 12.

The transfer server 60 may, in combination with the web services front end 58, publish a WSDL document describing the data processing services (e.g. transfer methods 51) provided by the transfer server 60 and, upon receiving a method call from a remote system, execute the applicable transfer method 51 and thereby provide the data processing service to the remote system making the method call.

The transfer methods 51 (which will be discussed in more detail with reference to FIG. 8) in the aggregate enable a remote unattended system making method calls to the web services server 46 to: i) perform functions similar to those performed by an operator of a remote browser systems using the application server module 45 of the web server 44; and ii) exchange files (or messages) with the back end application server 38.

More specifically with respect to performing functions similar to those performed by an operator of a browser system using the application server module, the transfer methods 51 enable a remote system to: i) upload files to the web services server 46 and invoke automated handling of the file by a data processing module 55 of the transfer server 60—which writes data from the uploaded file to the application tables 319; and ii) invoke reading of data from the application tables 319 and creation of a file by the data processing module 55 for downloading to the remote system by the web services server 46.

More specifically, with respect to exchanging files with the back end application server 38, the transfer methods 51 enable a remote system to: i) upload files to the transfer server 60 for storage as binary objects within object storage records 317 of the database 40—for subsequent retrieval by the applicable back end application server 38; and ii) download files or messages from the object storage records 317 which were previously provided to the web services server 46 by a back end application server 38.

Overview of Client System

The client system 13 comprises at least one business process application server 18, an administrator workstation 26, and a transfer client workstation 22 communicatively coupled by an IP compliant local area network 16. The local area network 16 may be coupled to the Internet 12 by firewall systems 14.

The business process application server 18 may operate a known database system or enterprise resource management (ERP) system for recording business process and financial transactions in a database (not shown). Further, the business process application server 18 may be configured (by a user of an administrator workstation) for unattended exchange of files between the business process application server 18 and the host system 11. More specifically the business process application server 18 is configured to: i) write data files which are intended for transfer to the web services server 46 of the host system 11 to a predetermined upload directory 50*a*; and ii) retrieve data files expected from the web services server 46 from a predetermined download directory 50*b*. As will be discussed herein, each of the upload directory 50*a* and the download directory 50*b* are either local or remote drives accessible to the business process application server 18 and the transfer client workstation 22.

The administrator workstation 26 may be a known networked computer system with a known operating system (not shown), IP networking hardware and software (not shown), and a known browser system 28 for establishing a TCP/IP connection with a remote web server and enabling the browser 28 to navigate web pages provided by the remote web server.

The administrator workstation 26 is useful for establishing a connection with the web server 44 of the host system 11 for:

i) navigating web pages provided by the data processing server module 48 for reading and writing data to the application tables 319 within the database 40 of the host system 11; and ii) navigating web pages provided by the configuration module 47 for configuring the systems for unattended remote file transfer.

The transfer client workstation 22 may also be a known networked computer system with an operating system 75 and IP networking hardware and software (not shown). The workstation 22 also includes a transfer client application 24.

The operating system 75 may manage a known directory system 74 and a known authentication registry 77. For purposes of illustrating the present invention, the directory system 74 comprises the upload directory 50*a* and the download directory 50*b*. As discussed, each of the upload directory 50*a* and the download directory 50*b* may be local or network drives available to each of the transfer client workstation 22 and the business process application servers 18.

For purposes of illustrating the present invention, the authentication registry 77 stores authentication credentials 70 used by the transfer client 24 for authenticating itself to the web services server 46. The authentication credentials 70 comprise a group ID value 71, a user ID value 72, and a Password 73. The authentication credentials are stored in an encrypted format.

In operation, the transfer client 24 periodically makes processing calls to the transfer methods 51 of the web services server 46 using SOAP messaging over secure TCP/IP channels. In aggregate, the processing calls provide for the transfer client 24 to authenticate itself to the web services server 46 utilizing the authentication credentials 70 as stored in the authentication registry 77 and obtain a Session ID from the web services server 46 for use with subsequent processing calls to the transfer methods 51. The subsequent processing calls enable the transfer client 24 to: i) provide the web services server 46 with a list of printers which are available to the transfer client workstation (so that an administer may configure downloaded files for automated printing); ii) obtain parameters for upload events and download events scheduled for the transfer client 24; and iii) execute each of such scheduled upload events and download events.

In general, execution of an upload event comprises transferring a file found in the upload directory 50*a* by: i) encapsulating the file, as a binary large object (e.g. BLOB), within an XML data processing call; ii) transferring the data processing call to the web services server 46 within a Simple Object Access Protocol (SOAP) message wrapper using an SSL channel; iii) generating a subsequent data processing call instructing the web services server 46 to invoke an applicable process within the data processing module 55 for handling the file if the file is to be loaded into the application tables 319 by the web services server 46; iv) providing destination ownership information to the web services server 46 if the file is to be subsequently retrieved by the back end application server 38; v) and moving the uploaded file from the upload directory 50*a* to a processed files directory 52 to eliminate overwriting the file or transferring the same file to the web services server 46 a second time. A more detailed description of execution of an upload event and the interaction between the transfer client 24 and the web services server 46 is included herein.

In general, execution of a download event comprises: i) generating a data processing call instructing the web services server 46 to invoke an applicable process within the data processing module 55 for extracting data from the application tables 319 and creating a file for download (if applicable); ii) generating data processing call(s) to web services server 46 to check if a file with applicable ownership information is available for download (whether newly created by the data processing module 55 or previously provide to the web services server 46 by the back end application server 38); iii) generating data processing call(s) to the web services server 46 to obtain the file as a BLOB through the SSL channel; and iv) saving the downloaded file in the download directory 50*b* for subsequent retrieval by the business process application server 18. A more detailed description of execution of a download event and the interaction between the transfer client 24 and the web services server 46 is included herein.

Configuration Module

As discussed, the configuration module 47 enables an operator of a remote system (such as an operator of the browser 28 of the administrator workstation 26) to entitle and configure a transfer client 24 for unattended file transfer with the web services server 46.

More specifically, the configuration module 47 establishes a secure TCP/IP connection with the browser 28 (upon initiation by the browser 28) and provides a menu driven sequence of web pages for: i) entitling a transfer client 24 (for download and installation on the transfer client workstation 22); ii) configuring the periodic connection (polling parameters) between the transfer client 24 and the web services server 46; and iii) configuring the upload events and download events which the transfer client 24 will perform.

Entitling Transfer Client and Installation

Figure 2:
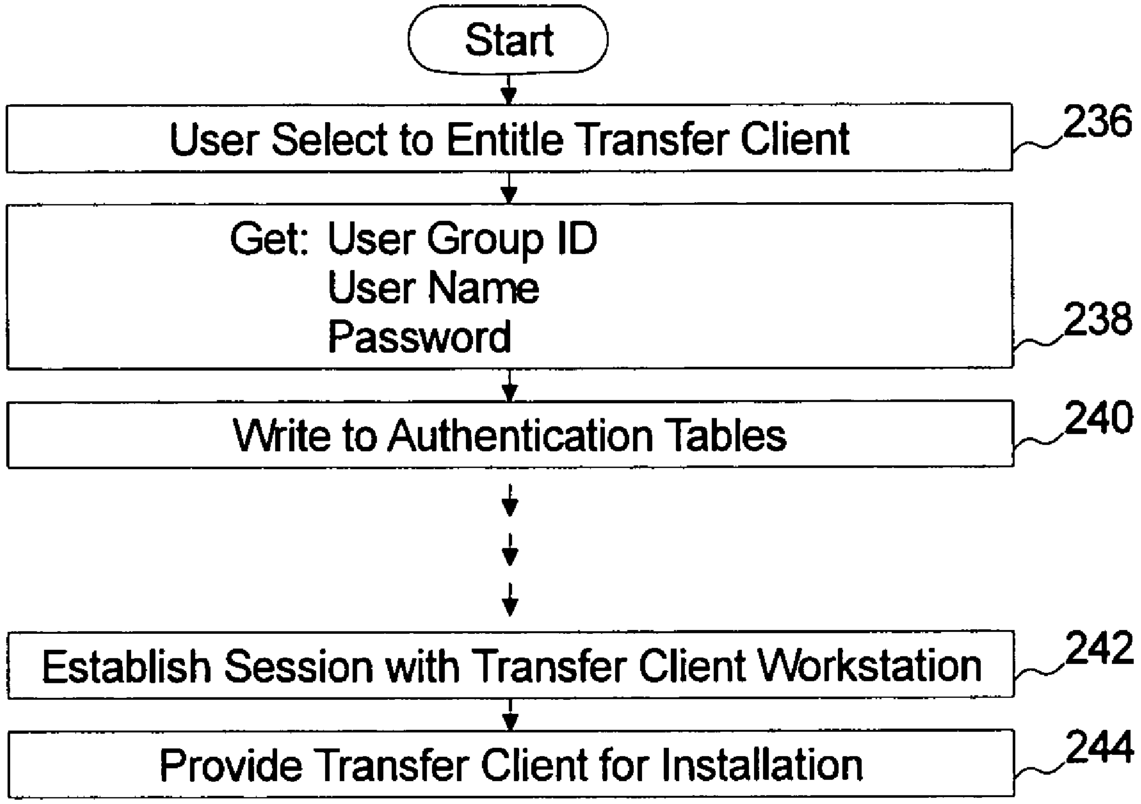
FIG. 2 is a flow chart representing exemplary operation of a configuration application in accordance with one embodiment of the present invention.

Turning to the flow chart of FIG. 2, exemplary steps performed by the configuration module 47 for entitling a transfer client and initially loading the transfer client 24 on a transfer client workstation 22 are shown.

After a TCP/IP connection has been established between the administrator workstation 26 and the server application 45 and after the administrator has been appropriately authenticated, the administrator may select a menu choice to entitle a transfer client. Step 236 represents the administrator selecting to entitle a transfer client.

Step 238 then represents the configuration module 47 obtaining initial configuration and authentication credentials 70 for the transfer client. The authentication credentials 70 include a user group ID value 71, a user ID value 72, and a password value 73. These may be obtained from the administrator or generated by the module 47. Step 240 represents writing the initial authentication credentials 70 to a user ID table 314 within the database 40.

Figures 3, 4:
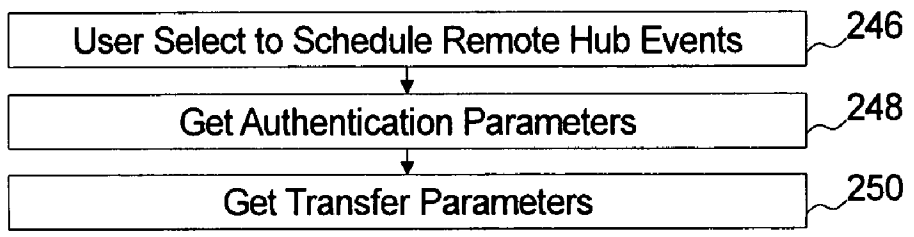
FIG. 3 is an exemplary User ID table in accordance with one embodiment of the present invention.
FIG. 4 is a flow chart representing exemplary operation of a configuration application in accordance with one embodiment of the present invention.

Turning briefly to FIG. 3, an exemplary user ID table 314 is shown. The user ID table 314 includes a plurality of records 352, each identified by a unique index 360 and each of which includes the authentication credentials 70 of a transfer client 24 configured for periodic file transfer with the web services server 46. Each record comprises a transfer client ID 362 which may comprise a separate user group ID field 354 and a user ID field 356 for storing the user group ID value 71 and user ID value 72 assigned to the transfer client 24 respectively. Additional fields include: i) a password field 358 for storing the then current password value 73 (in encrypted form) assigned to the transfer client 24, ii) an interval field 364 for storing a time period which defines a time interval at which the transfer client will make a sequence of processing calls to the web services server 46 to perform various actions which include authenticating itself and obtaining a new session ID, iii) a session time field 366 which stores a time stamp representing the most recent time at which the transfer client made such sequence of processing calls to the web services server 46 to obtain a new session ID; iv) an alert instruction field 367 which identifies an email address or other notification address to which notification is to be sent in the event that a transfer client 24 fails to make the sequence of processing calls to the web services server 46 to obtain a new session ID 83 within a timely manner (e.g. within the period of time stored in the intervals field 364 following the time stamp 93 stored in the session time field 366, v) a session ID field 368 storing the most recent session ID 83 assigned to the transfer client 24; and vi) a status field 369 storing a "true" value if the transfer client 24 had been properly configured and authorized and storing a "false" value prior to authorization or if a logon attempt has been made with an incorrect password. If the status field 369 is set "false", the web services server 46 may deny access to the workstation 22 as will be discussed in more detail with respect to FIG. 9.

It should be appreciated that in the exemplary embodiment, the group ID value 71, user ID value 72, and password value 73 are initially written to the user ID table 314 at step 240 and the remaining fields are written during configuration or operation as discussed herein.

Returning to FIG. 2, after writing the group ID value 71, user ID value 72, and password value 73 to a record 352 of the user ID table 314, the TCP/IP connection with the administrator workstation 26 may be torn down and step 242 represents establishing a secure TCP/IP connection with the transfer client workstation 22. More specifically, to download the transfer client 24 to the workstation 22, the administrator utilizes a browser of the client workstation 22 (not shown) to establish the secure TCP/IP connection to the server application 45. It should be appreciated that when establishing the connection from the workstation 22, the administrator authenticates the workstation using the authentication credentials 70 provided at step 238. After the TCP/IP connection is established, and the workstation/administrator authenticated, the transfer client 24 can be downloaded to the workstation 22 for installation by the operator. Step 244 represents the server application providing the code for the transfer client 24 to the workstation 22.

In the exemplary embodiment, the code for the transfer client 24 may be executable code or interpretable code conforming with Active X Protocols or virtual machine protocols such that the transfer client 24 self installs at step 244. In the exemplary embodiment, installation includes writing the authentication credentials 70 to the authentication registry 77 so that the transfer client 24 may begin its periodic authentication to the web services server 46 and execute the applicable upload, download, and gateway events.

Configuration

In addition to entitling and installing the transfer client 24 in accordance with the steps of FIG. 2, the administrator also utilizes the browser 28 of the administrator workstation 26 to configure operation of the transfer client 24—which includes configuring authentication parameters and file transfer parameters—including upload event parameters, download event parameters, and gateway event parameters.

The flow chart of FIG. 4 represents exemplary steps of configuring such parameters. It should be appreciated that these configuration steps may be performed initially upon entitling the client 24 and may be updated at times thereafter when appropriate.

To initiate configuration, the administrator establishes a secure TCP/IP connection with the server application 45 and selects an applicable menu choice for configuration. Step 246 represents receiving administrator selection of the menu choice to configure a transfer client 24.

Step 248 represents obtaining the periodic authentication parameters for the transfer client 24 and writing such authentication parameters to the user ID table 314 (FIG. 3) in the database 40. More specifically, step 248 represents providing web pages to the administrator workstation 26 to enable the administrator to provide a time interval value 78 (typically one minute) for storage in the interval field 364 of the user ID table 314 and provide a notification address 79 for writing to the alert instruction field 367.

Returning to FIG. 4, step 250 represents configuring file transfer parameters within event tables 310 of the database 40. In the exemplary embodiment, the transfer client 24 obtains all if its instructions and parameters related to each upload event, download event, and gateway event from the web services server 46. More specifically, the administrator configures event parameters for each event within the event tables 310 of the database 40 using the configuration module 47 of the web server 44. The transfer client 24 retrieves such event parameters during the course of periodically authenticating itself to the web services server 46.

Turning briefly to FIGS. 5*a* and 5*b*, exemplary event tables 310 include an event key table 311 (FIG. 5*a*) and an event parameter table 316 (FIG. 5*b*).

The event key table 311 includes a plurality of records 313. Each record 313 associates an event with the transfer client 24 that is to execute the event. The transfer client 24 is identified by its group ID value 71 (stored in a group ID field 354) and its user ID value 72 (stored in a user ID field 356). The event is identified by an event key value 80 stored in an event key field 315. Each upload event and download event that a transfer client 24 is configured to perform is identified by an event key value 80 and is associated with the transfer client 24 in the event key table 311.

The event parameter table 316 includes a plurality of records 320. Each record includes an event key field 315, a parameter ID field 321, and a parameter value field 322. Each event parameter value is stored in a separate record 320 in the event parameter table 316 and is identified by an event parameter ID stored in the event parameter ID filed 321. Both the parameter ID field 321 and the parameter value field 322 are text fields such that the information stored therein can be assembled as an XML file for providing to a transfer client 24 (Step 170 of FIG. 25 discussed herein). The event to which the parameter associates is identified by its event key value 80 stored in the event key field 315.

Turning briefly to FIG. 5*c*, exemplary event parameters which may be associated with an upload event include: i) a file name 323 identifying the name of the file to be uploaded; ii) an upload directory path 324 identifying the upload directory in which the file is to be located; iii) a BLOB handling field 326 identifying whether the file, after uploading is to be left as a "message" for retrieval by another system or loaded by the web services server 46 into the application tables 319; iv) a destination group ID value 325 identifying a destination group to receive the file after transfer to the web services server—if the file is to be left as a "message" for retrieval by another system identified by the destination group value; v) BLOB loading rules 327 identifying a local data processing function and parameters for calling such local data processing function for loading the file into the application table 319 if handling by the web services server is applicable; vi) a status parameter 328 identifying the then current status of the event (such as whether the event has started, the time started, the event is completed, the time completed, the event was aborted, or the time aborted); vii) an email address 101 identifying an address to which a notification email is to be sent; iv) an email code 102 identifying conditions for sending the email notification.

Turning briefly to FIG. 6, exemplary email codes 102, as stored as records in an email codes table 102, include an email code 01 for no email notification (in which case the email address field 101 may be blank), an email code 02 for sending a notification email upon successful completion of the event; an email code 03 for sending an email upon failure to successfully complete the event; and an email code 04 for sending an email upon either success completion of, or failure to successfully complete, the event.

Turning briefly to FIG. 5*d*, exemplary event parameters which may be associated with a download event include: i) a file name 342 which identifies the name of the file to be downloaded; ii) a download directory path parameter 343 which identifies the download directory 50*b* to which the file is to be written, iii) a BLOB generation parameter 345 which identifies whether the BLOB is to be generated by the data processing module 55 of the web services server 46 by reading data from the application table 319 (e.g. a data processing down load event) or whether the BLOB is a file previously provided to the web services server 46 by another system (e.g. a messaging event); iv) a profile ID 347 and extract rules 349 which are instructions for generating the BLOB based on data from the application tables 319 if the event is a data processing download event; v) a class 351 and offset 353 for identifying the BLOB in the ownership tables 62; vi) a status parameter 355 identifying the then current status of the event (such as whether the event has started, the time started, the event is completed, the time completed, the event was aborted, or the time aborted); vii) an email address 101 identifying an address to which a notification email is to be sent; viii) an email code identifying conditions for sending the email notification; ix) a printer field 359; and x) a print code field 357. The print code field 357 stores and indication of whether a file should automatically be sent to a printer upon download. The printer field 359 identifies the specific printer to which the file should be sent.

Turning briefly to FIG. 7, the available printers table 318 includes a plurality of records 374. Each record associates a printer (identified by its printer ID value 81 in a printer ID field 378) with the group ID value 71 and user ID value 72 of a transfer client 24. As will be discussed, each transfer client 24 periodically updates the available printers table 318 such that an administrator may configure download events in a manner that provides for the transfer client 24 to automatically send to the downloaded filed to an available printer.

Web Services Server

As discussed, the web services server 46 may comprise a web services module 58 and a transfer server 60. The web services module 58 may be a known web services front end which utilizes the simple object access protocol (SOAP) for exchanging XML messages with remote systems (and in particular the transfer client 24 of the transfer client workstation 22) using SSL channels over the Internet 12.

The transfer server 60 may, in combination with the web services module 58 publish a WSDL document describing the transfer methods 51—and, upon being called by a transfer client 24, execute such methods. Turning briefly to FIG. 8, an exemplary listing of the transfer methods 51 which are performed by the transfer server 60 are shown. These methods, in the aggregate, provide for the automated file transfer systems as discussed above. The steps executed to perform each transfer method 51 is discussed with respect to one of the flow charts of FIGS. 9 through 21 respectively and operation of the transfer client 24 in calling such methods to perform the file transfers is discussed later herein.

Check Status Method

Figure 9:
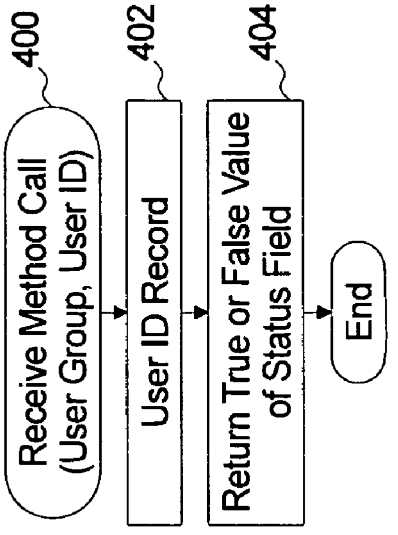

The flow chart of FIG. 9 represents a transfer method 51 called Check Status which is executed by the web services server 46 in response to receiving a check status method call from a transfer client 24. Step 400 represents receipt of the parameters of the method call which include a user group ID value 71 and a user ID value 72 assigned to the transfer client (during configuration discussed later herein).

Step 402 represents retrieving the record 352 from the User ID table 314 which corresponds to the group ID value 71 and the user ID value 72 and step 404 represents returning the "True" or "False" value of the status field 369 of the record 352.

As will be discussed in more detail herein, if the value of the status field 369 is false, the transfer client 24 either has not been authorized or has attempted to authenticate with an incorrect password. In either case, the transfer client 24 is not permitted to interact with the web services server 46 until such time as the value of the status field 369 has been returned to true.

Log-On Method

Figure 10:
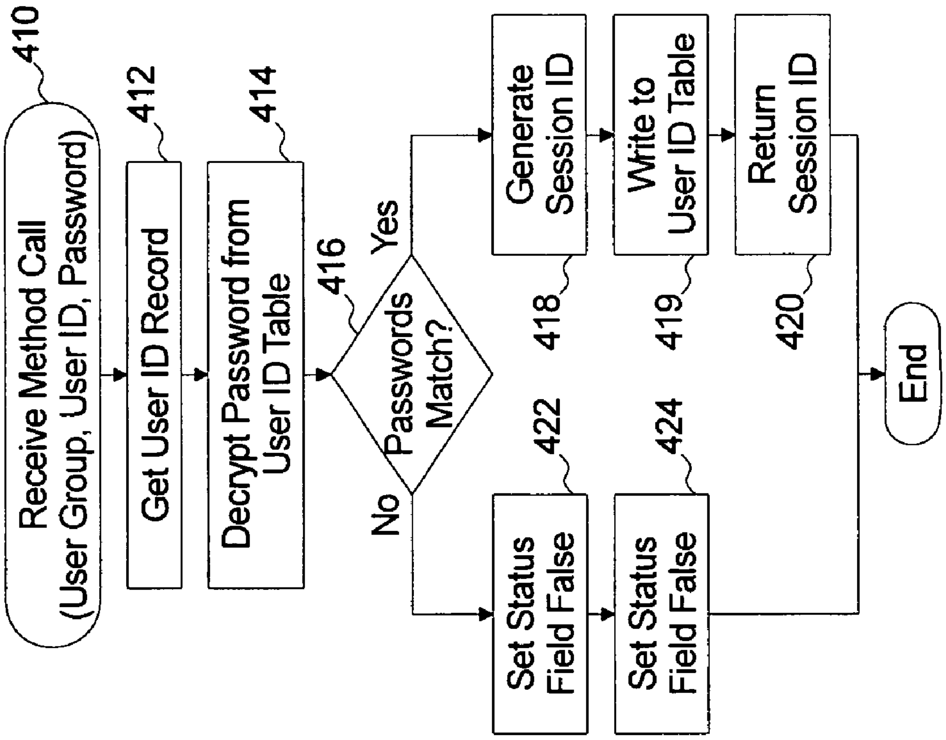

The flow chart of FIG. 10 represents a transfer method 51 called Log-On which is executed by the web services server 46 in response to receiving a Log-On method call from a transfer client 24. Step 410 represents receipt of the parameters of the method call which include the group ID value 71, the user ID value 72, and the then current password value 73.

Step 412 represents retrieving the encrypted password value 82 from the record 352 of the user ID table 314 which corresponds to the group ID value 71 and the user ID value 72.

Step 414 represents decrypting the encrypted password value 82. In the exemplary embodiment, the encrypted password value 82 is generated using a one way ciphering technique wherein the password value itself is the key for deciphering the encrypted password value 82. As such, when a password value 73 is provided by the transfer client 24, it may be used as a key for deciphering the encrypted password value 82. If the password value 73 matches the deciphered value, then the password provided by the transfer client 24 matches the original password which was encrypted into the encrypted password value 82 and stored in the user ID table 314.

Step 416 represents determining whether the password value 73 provided by the transfer client 24 matches the result of deciphering the encrypted password value 82. If there is a match, a Session ID 83 is generated at step 418.

Step 419 represents writing the Session ID 83 to the Session ID field 368 of the user ID table 314 and writing a time stamp (representing the time the Session ID was generated) to the Session Time field 366 of the user ID table 314. Step 420 represents returning the Session ID 83 to the transfer client 24.

Alternatively, if the password value 73 provided by the transfer client 24 does not match the result of deciphering the encrypted password 82 at decision box 416, the status field 369 of the record 352 is set to "False" at step 422 and notification is sent to the notification address 79 as stored in the alert instruction field 367 of the record 352 at step 424. In the exemplary embodiment, the notification address 79 will be an email address to which certain information about the failure is sent. The information may include the group ID value 71 and the user ID value 72.

Get Password Method

Figure 11:
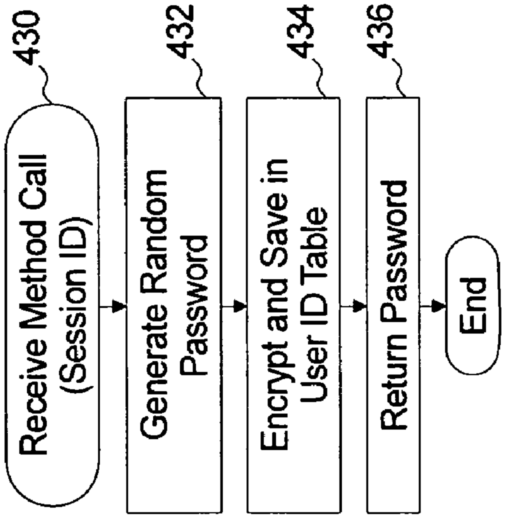

The flow chart of FIG. 11 represents a transfer method 51 called Get Password which is executed by the web services server 46 in response to receiving a Get Password method call from a transfer client 24. Step 430 represents receipt of the parameters of the method call which include the Session ID 83.

Step 432 represents generating a random password value 73. At step 434 the password value 73 is encrypted to generate an encrypted password value 82 and saving the encrypted password value 82 in the password field 358 of the record 352 in the User ID table 314 which corresponds to the Session ID 83.

Step 436 represents returning the randomly generated password 73 to the transfer client 24.

Send Printers Method

Figure 12:
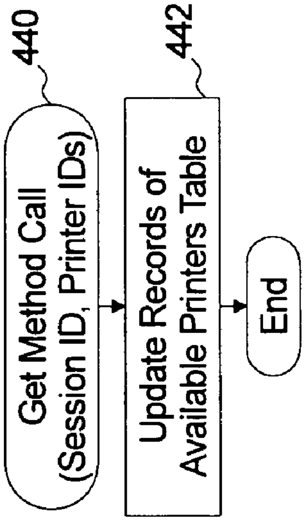

The flow chart of FIG. 12 represents a transfer method 51 called Send Printers which is executed by the web services server 46 in response to receiving a Send Printers method call from a transfer client 24. Step 440 represents receipt of the parameters of the method call which include the Session ID 83 and the Printer ID value 81 of each printer available to the transfer client workstation 22.

Step 442 represents updating the records 374 of the available printers table 318 to reflect printers then currently available to the transfer client workstation 22.

Retrieve Active Event Keys Method

Figure 13:
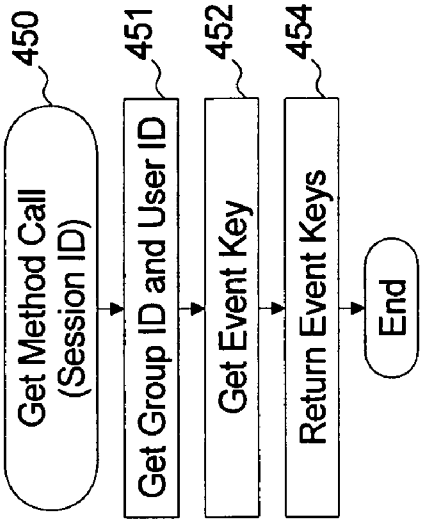

The flow chart of FIG. 13 represents a transfer method 51 called Retrieve Active Event Keys which is executed by the web services server 46 in response to receiving a Retrieve Active Events Keys method call from a transfer client 24. Step 450 represents receipt of the parameters of the method call which include the Session ID 83.

Step 452 represents retrieving the group ID value 71 and the user ID value 72 associated with the Session ID 83 from the User ID table 314.

Step 454 represents retrieving each Event Key value 80 associated with the group ID value 71 and the user ID value 72 in the event key table 311 (FIG. 5*a*).

Step 454 represents returning each retrieved event key value 80 to the transfer client 24.

Read Event Method

Figure 14:
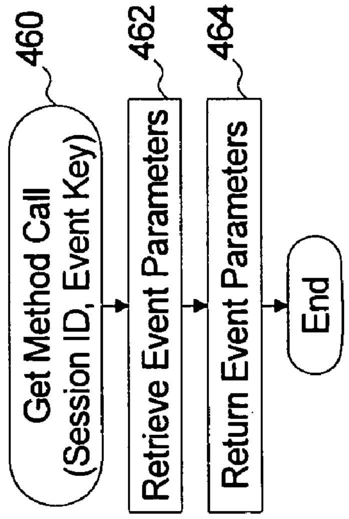

The flow chart of FIG. 14 represents a transfer method 51 called Read Event method which is executed by the web services server 46 in response to receiving a Read Event method call from a transfer client 24. Step 460 represents receipt of the parameters of the method call which include the Session ID 83 and an Event Key value 80.

Step 462 represents retrieving the event parameters (e.g. each parameter ID and its associated parameter value) associated with the event on the event parameter table 312 (FIG. 5*b*).

Step 464 represents returning the event parameters to the transfer client 24.

Update Event Method

Figure 15:
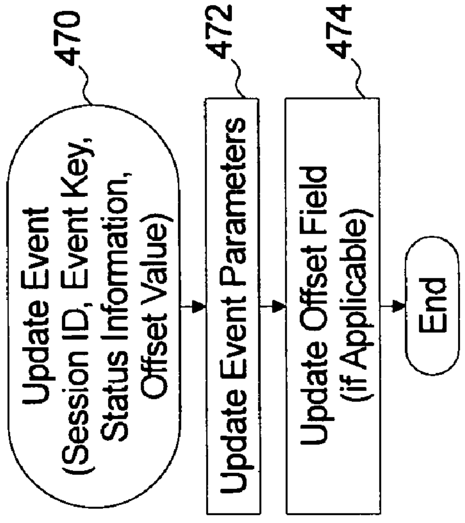

The flow chart of FIG. 15 represents a transfer method 51 called Update Event which is executed by the web services server 46 in response to receiving an Update Event method call from a transfer client 24. Step 470 represents receipt of the parameters of the method call which include the Session ID 83, an Event Key value 80, Status Information, and an Offset Value. In the exemplary embodiment, the status information may be identification of a parameter ID 321 and a parameter value 322 for storage in the event parameter table 316. It is useful for the transfer client 24 to be able to update parameter values during execution of an event to reflect the processes performed. The offset value is a value representing an increment such that the number of time that an event has been processed can be tracked. This is useful for avoiding duplicate upload events, download events, or gateway events for the same file.

Step 472 represents updating the event parameter table 316 as applicable to reflect the status information provided in the Update Event method call.

Step 474 represents updating the offset value as stored in the event parameter table 316 to reflect the Offset Value provided in the Update Event method call.

Create BLOB Method

Figure 16:
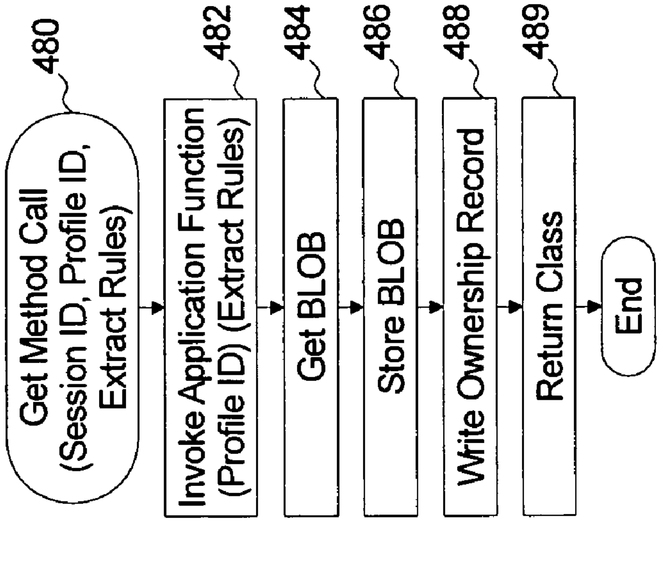

The flow chart of FIG. 16 represents a transfer method 51 called Create BLOB method which is executed by the web services server 46 in response to receiving a Create BLOB method call from a transfer client 24. Step 480 represents receipt of the parameters of the method call which include the Session ID 83, a Profile ID 347, and extract rules 349.

Step 482 represents invoking a local function (e.g. a function executed by the data processing module 55 of the transfer server 60) which corresponds to the to the profile ID 347 to retrieve applicable data from the application tables 319 and providing the extract rules 349 to a file building system which formats the retrieved data in a file format compatible with (e.g. for loading into) the business process application server 18. For example, in a balance and transaction reporting system, the profile ID 347 may indicate a data processing method and a group of parameters which result in the data proceeding module retrieving today's balance values for a certain group of accounts from the application tables 319. The extract rules 349 may identify to the file building system that the balances and associated data retrieved from the application tables should be formatted as a particular type of EDI file recognizable by the business process application server 18.

Step 484 represent obtaining the BLOB from the data processing module 55 and step 486 represents writing the BLOB to the object storage 317.

Step 488 represents creating an ownership record 63 in an ownership table 62 and populating each of the fields for which a value is available.

Step 489 represents returning a class value to the transfer client 24 making the processing call to the web services server.

Turning briefly to FIG. 22, an exemplary ownership table 62 is shown. The ownership table 62 comprises a plurality of records, each of which is associated with a BLOB stored in the object storage 317.

The fields of the ownership table 62 comprise a BLOB ID field 85, a class field 86, a destination group ID field 87, and an offset field 88. The BLOB ID field 85 stores a BLOB ID value 89 which identifies a particular BLOB stored in the object storage 317. The class field 86 stores a class value 90 which identifies the type of data within the BLOB which, in the exemplary embodiment may be a file name extension. The destination group ID field 87 stores a destination group ID value 91 which identifies the group ID value of another transfer client 24 of a remote system or the back end application server 38 which may retrieve the BLOB. The offset field 88 stores an offset value 92 which is an increment value assigned to the BLOB and is useful for preventing duplicate downloading of the same BLOB.

Check for Available BLOB (CFAB) Method

Figure 17:
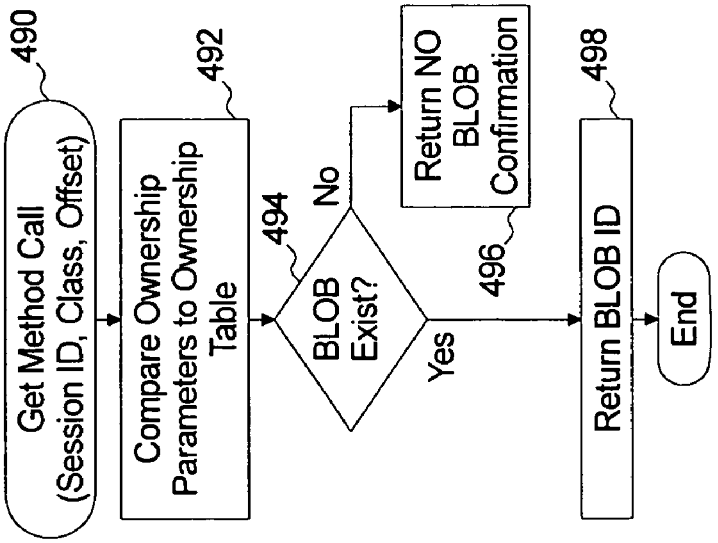

The flow chart of FIG. 17 represents a transfer method 51 called CFAB method which is executed by the web services server 46 in response to receiving a CFAB method call from a transfer client 24.

Step 490 represents receipt of the parameters of the method call which include the Session ID 83, a Class value 90, and an Offset Value 92.

Step 492 represents comparing ownership parameters to values within the ownership table 62 to determine whether a BLOB exists for downloading. More specifically, i) the class value 90 provided in the method call is compared to the class value 90 of each record 63 of the ownership table 62 to determine if a BLOB with a class value matching the class value provided in the method call exists; and ii) the group ID value 71 (which associates with the session ID value 83 in the user ID table 314) is compared to the destination group ID value 91 of each record 63 of the ownership table 62 to determine if a BLOB with a destination group ID value 91 matching the group ID value 71 of the transfer client 24 exists.

In either case, the offset value 92 provided in the method call is compared to the offset value 92 in the ownership table 62. An offset value 92 in the ownership table 62 that is higher than the offset value 92 provided in the method call indicates that the BLOB has not yet been downloaded and therefore exists for downloading.

If a BLOB exists for downloading as determined at decision box 494, the BLOB ID 89 from the record 63 is returned to the transfer client 24 at step 498. If no BLOB meeting the ownership requirements exists, a "NO BLOB" confirmation is returned to the transfer client 24 at step 496.

Download BLOB Method

Figure 18:
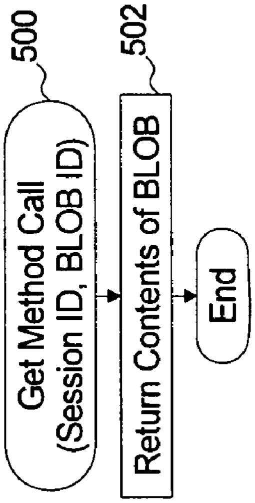

The flow chart of FIG. 18 represents a transfer method 51 called Download BLOB method which is executed by the web services server 46 in response to receiving a Download BLOB method call from a transfer client 24.

Step 500 represents receipt of the parameters of the method call which include the Session ID 83 and a BLOB ID 89.

Step 502 represents retrieving the BLOB corresponding to the BLOB ID 89 from the object storage 317 and providing the contents of the BLOB to the transfer client 24.

Upload File Method

Figure 19:
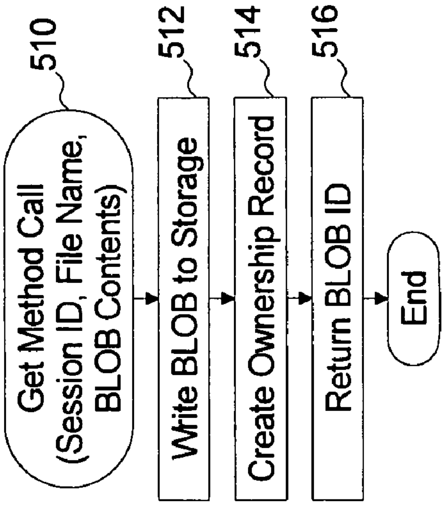

The flow chart of FIG. 19 represents a transfer method 51 called Upload BLOB method which is executed by the web services server 46 in response to receiving an Upload BLOB method call from a transfer client 24.

Step 510 represents receipt of the parameters of the method call which include the Session ID 83, a file name, and the contents of the BLOB.

Step 512 represents writing the BLOB to the object storage 317 and step 514 represents creating and populating an ownership record 63 in the ownership table 62.

Step 516 represents returning the BLOB ID to the transfer client 24 making the processing call to the web services server 46.

Set Destination BLOB Owner Method

The flow chart of FIG. 20 represents a transfer method 51 called Set Destination BLOB Owner method which is executed by the web services server 46 in response to receiving a Set Destination BLOB Owner method call from a transfer client 24.

Step 520 represents receipt of the parameters of the method call which include the Session ID 83, a BLOB ID 89, and destination user group 91.

Step 522 represents writing modifying the ownership record 63 associated with the BLOB ID 89 in the ownership table 62 by writing the destination user group ID 91 provided in the method call to the destination group ID field 87 of the record 63.

Process BLOB Method

The flow chart of FIG. 21 represents a transfer method 51 called Process BLOB method which is executed by the web services server 46 in response to receiving a Process BLOB method call from a transfer client 24.

Step 530 represents receipt of the parameters of the method call which include the Session ID 83, a BLOB ID, a Profile ID, and Loading Rules.

Step 532 represents invoking an application function of the data processing module 55 for loading the contents of the BLOB into the application tables 319 in accordance with the loading rules. Both identification of the application function and the loading rules are as set forth in the event parameter table 316 and are provided by the transfer client 24 as part of the method call.

Web Services Server Monitoring of Polling

In addition to providing the methods discussed with respect to FIGS. 9 through 21, the transfer server 60 also includes a session ID monitoring process 53 for monitoring the polling of each transfer server 60 and, if a transfer server fails to periodically contact the web services server 46 to update its password and events, the web services server 46 can generate a failure to poll alert.

Referring to FIG. 23, the session ID monitoring process 53 monitors the session time field 366 and the interval field 364 of each record 352 of the User ID table 314. Such monitoring is represented by step 231. In the event that the current time exceeds the time stamp 93 stored in the session time field 366 by more than the time interval 78 stored in the interval field 364, the transfer client 24 (identified by group ID 71 and user ID 72 of the record 352) has failed to authenticate itself and obtain a Session ID (in accordance with the flowchart of FIG. 25 as will be discussed later herein) within the proper interval time. Determining that such failure exists is represented by decision box 233.

In response to such failure, the web services server 46 will generate an alert email to the notification address 79 as stored in the alert instruction field 367 at step 235.

Transfer Client

Returning to FIG. 1, as discussed the transfer client workstation 22 may also be a known networked computer system with an operating system 75, IP networking hardware and software (not shown), and the transfer client application 24.

The operating system 75 may manage the directory system 74 and the authentication registry 77. In the exemplary embodiment, the operating system may be one of the operating systems available from Microsoft® under its Windows® trade name or another suitable operating system providing the structures and functions useful for implementing the present invention.

The transfer client 24 includes authentication function 25 and, when applicable event parameters are obtained from the web services server 46, includes spawned upload processes 27, spawned download processes 29, and spawned gateway processes 31.

In general, the authentication function 25 is periodically performed by the transfer client 24 to authenticate itself to the web services server 46, update its password value 73, obtain a session ID 83, update the available printers table 318, and obtain event parameters for upload, download, and gateway events. Each of the spawned processes 27, 29, and 31 is built by the transfer client 24 utilizing event parameters received from the web services server 46 for the purpose of executing the event. Each of the authentication function 25 and the spawned processes 27, 29, and 31 make calls to local processes 23 which are shown, in conjunction with the required process parameters, in the table of FIG. 24.

Authentication Function

Figure 25:
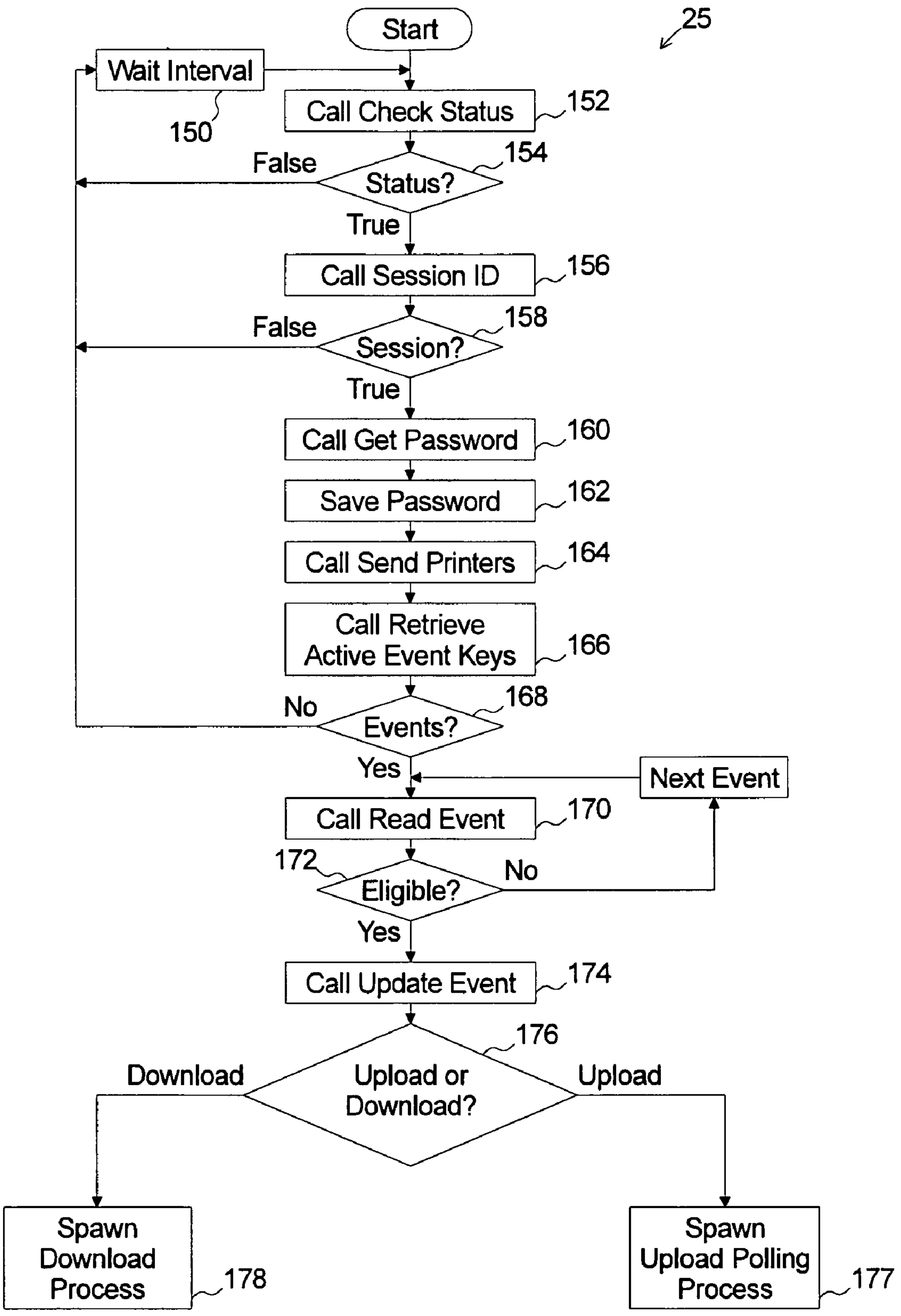
FIG. 25 is a flow chart representing exemplary authentication function of a transfer client in accordance with one embodiment of the present invention.

The flow chart of FIG. 25 represents exemplary operation of the authentication function 25 of the transfer client application 24. The authentication function 25 initially runs upon loading of the transfer client 24 onto the workstation 22 and periodically thereafter as defined by the interval time value 78 stored in the user ID table 314.

Step 152 represents the transfer client application 24 executing a local process 23 called Check Status at step 152. Check Status makes a method call to a transfer method 51 operated by the web services server 46. The transfer method 51 is also called "Check Status". The method call is formatted as an XML message and transferred to the web services server 46 within a SOAP message wrapper over an SSL channel.

The local function provides each of the group ID value 71 and the user ID value 72 (from the authentication registry 77) to the web services server 46 as part of the method call. In response, the web services server 46 executes the Check Status Method as discussed with respect to FIG. 9 which includes looking up the record 352 corresponding to the group ID value 71 and user ID value 72 in the user ID table 314 to determine if the transfer client 24 is active. The "True" or "False" value in the status field 369 of the record 352 is returned to the transfer client.

If the status value is "False", at decision box 154, the transfer client 24 waits the applicable time interval 78 before again making the Check Status Method call to the web services server 46 at step 152.

If the status value is "True", at decision box 154, the transfer client 24 executes a local process 23 called Session ID at step 156. Session ID makes a method call to a transfer method 51 operated by the web services server 46. The transfer method 51 is also called "Session ID". The local process 23 provides each of the group ID value 71, the user ID value 72, and the password value 73 (from the authentication registry 77) to the web service server 46 as part of the method call. In response web services server executes its Session ID Method as discussed with respect to FIG. 10 and returns a Session ID 83 if the transfer client 24 is properly authenticated.

If a Session ID 83 is not obtained, as determined by decision box 158, the transfer client 24 again waits the applicable time interval 78 before again making the Check Status Method call to the web services server 46 at step 152.

If a Session ID 83 is obtained, the transfer client 24 executes a local process 23 called Get Password at step 160. Get Password makes a method call to a transfer method 51 operated by the web services server 46. The transfer method 51 is also called "Get Password". The local process provides the Session ID 83 as a parameter of the Get Password method call. In response web services 46 executes a Get Password method as discussed with respect to FIG. 11 and returns a randomly generated password 73 to the transfer client 24.

In response to receiving the randomly generated password 73, the transfer client 24 executes a local function called Save Password at step 162 to save the randomly generated password 73, in encrypted form, in the authentication registry 77

Step 164 represents the transfer client 24 executing a local process 23 called Send Printers. Send Printers makes a method call to a transfer method 51 operated by the web services server 46. The transfer method 51 is also called Send Printers. The local process provides the Session ID 83 as well as the printer ID value 81 of each printer accessible to the transfer client workstation 22 as parameter of the Send Printer method call. In response the web services server 46 executes its Send Printers method as discussed with respect to FIG. 12 for updating the available printers table 318.

Step 166 represents the transfer client 24 executing a local process 23 called Retrieve Active Event Keys. The local process makes a method call to a transfer method 51 operated by the web services server 46. The transfer method 51 is also called Retrieve Active Event Keys. The local process provides the Session ID 83 as the parameter of the Retrieve Active Event Keys method call. In response, the web services server 46 executes the Retrieve Active Event Keys Method as discussed with respect to FIG. 13 and returns the event key value 80 for each event in the event key table 311 associated with the transfer client 24.

If no event key values 80 are returned, as determined at decision box 168, the transfer client 24 waits the time interval 78 before again sending a Check Status method call at step 150. If at least one Event Key value 80 is returned, each event is performed in sequence.

Step 170 represents executing a local process 23 called Read Event. Read Event make a method call to a transfer method 51 operated by the web services server 46. The transfer method 51 is also called Read Event. The local function provides the Session ID 83 and the event key value 80 as parameters of the method call. In response, the web services server 46 executes its Read Event method as discussed with respect to FIG. 14 and returns all of the parameters associated with the event key value 80 in the event parameter table 316. The values are returned as an XML file with the parameter ID 321 being the XML tag and the parameter value 322 being associated with the tag.

Decision box 172 represents determining whether the event associated with the Event Key value 80 is eligible to run. For example, parameters of the event parameter table 316 may identify certain time periods or certain frequencies that events may be ran. If the event is outside of such time period or frequency parameters, the event is considered ineligible to run. If not eligible, the next event key value 80 is selected and the local process 23 Read Event is executed for such next event key value 80 at step 170.

Step 174 represents executing a local process 23 called Update Event. Update Event makes a method call to a transfer method 51 operated by the web services server 46. The transfer method 51 is also called Update Event. The local function provides the Session ID 83, event key value 80, status information (such as the time the event was started, the time the event was completed, or the time the event was aborted) and an offset value as parameters of the method call. The purpose of this Update Event processing call is to update applicable fields in the event parameter table 316 to indicate the then current status of the event. In response, the web services server 46 will execute its Update Event Method as discussed with respect to FIG. 15 for purposes of updating the applicable status records of the event parameters table 316.

The event associated with the event key value 80 may be any of a download event, an upload event, or a gateway event. The type of event is identified by a parameter value returned at step 170. Step 176 represents determining whether the event is an upload event or a download event. If the event is an upload event, an upload polling process 27 is spawned at step 177. If the event is a download event, a download process 29 is spawned at step 178.

Spawning Download Process

Figure 26:
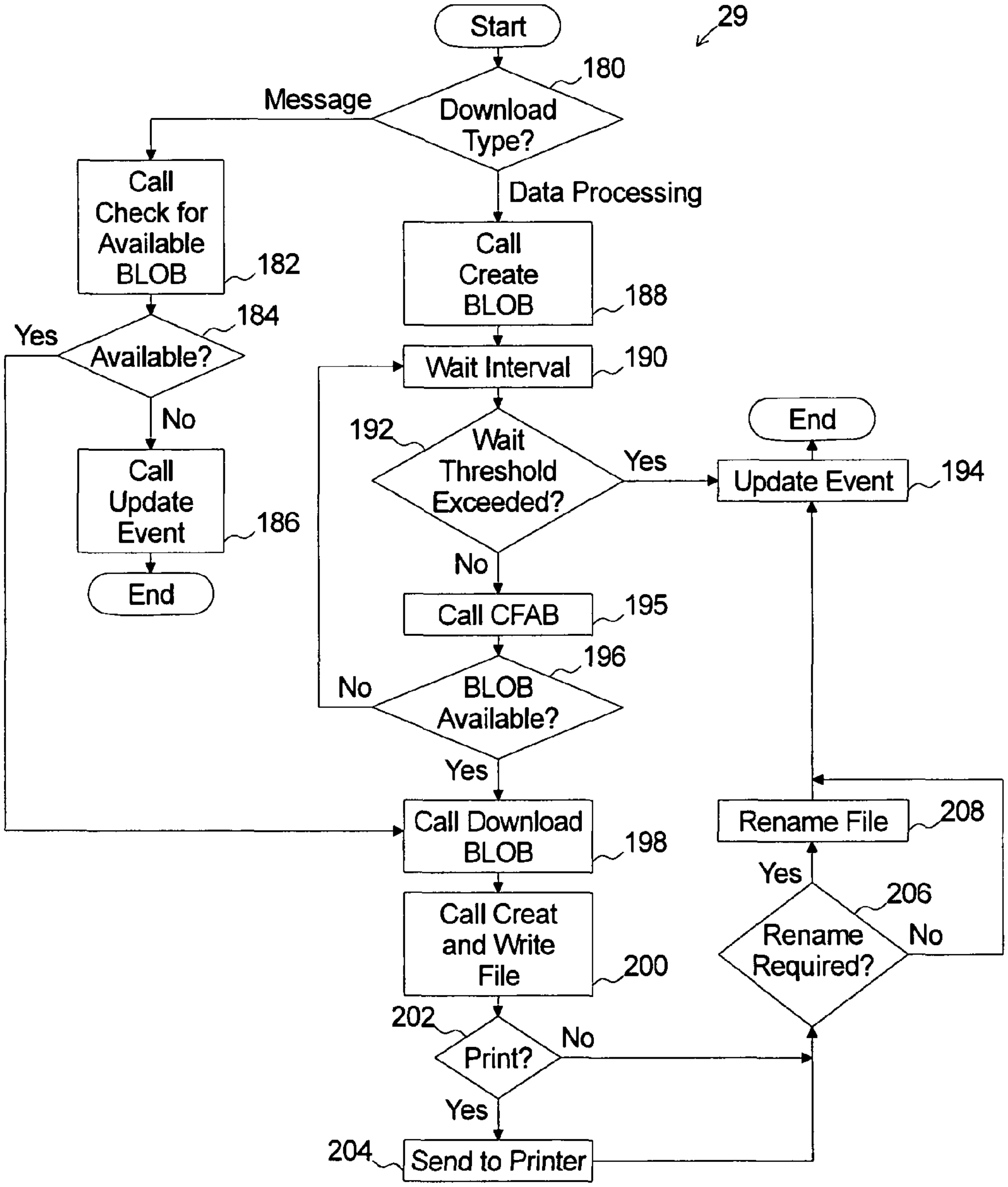
FIG. 26 is a flow chart representing an exemplary download process in accordance with one embodiment of the present invention.

The flow chart of FIG. 26 represents exemplary operation of a spawned download process 29.

Step 180 represents determining the type of the download event. The download event may be either a message event or a data processing event. The type of event is identified by the event type parameter 344 from the event parameter table 316 and received at step 170.

If the event is a message event, the transfer client 24 executes a local process 23 called Check For Available BLOB. The local function makes a method call to a transfer method 51 operated by the web services server 46. The transfer method 51 is also called Check For Available BLOB. The local process provides the Session ID 83, a class value 90, and offset value 92 as parameters of the method call. In response, the web services server 46 executes its Check For Available BLOB method as discussed with respect to FIG. 17 and returns a BLOB ID 89 if a BLOB meeting the criteria is available and not yet downloaded.

If no BLOB is available, as determined at decision box 184, the transfer client 24 again executes the local process 23 called Update Event at step 186—for the purpose writing an indication that the event is complete to applicable records of the event parameter table 316.

Following execution of Update Event, the transfer client again returns to step 170 where the function Read Event is executed for the next Event Key value 80 provided by the web services server 46.

If a BLOB is available at decision box 184, the transfer client 24 executes a local process 23 called Download BLOB. The local process 23 makes a method call to a transfer method 51 operated by the web services server 46. The transfer method 51 is also called Download BLOB. The local function provides the Session ID 83 and BLOB ID 89 as parameters of the method call. In response, the web services server 46 executes its Download BLOB Method as discussed with respect to FIG. 18 and returns the contents of the BLOB associated with the BLOB ID 89.

Step 200 represents the transfer client 24 executing a local process 23 called Create And Write File. Create And Write File stores the BLOB using the file name parameter 342 in the in the download directory 50*b* identified by the download directory path parameter 343—both associated with the event in the event parameter table 316 and provided to the transfer client in response to the Read Event method call at step 170.

Step 202 represents determining whether the file just downloaded should be queued for automatic printing. The event parameters received at step 170 may include an indication that the file should be automatically printed (e.g. print code 357) and an indication of one of the available printers (e.g. printer 359). If yes at step 202, the transfer client 24 executes a local function called Send To Printer at step 204. The local function retrieves the printer ID from the parameters provided at step 170 and queues the file for the printer.

Following execution of Send to Printer, or upon determining that the downloaded file is not to be sent to a printer, the transfer client 24 determines whether the Event Parameters require renaming the file as represented by decision box 206.

If yes, step 208 represents the transfer client 24 executing a local process 23 called Rename File. The parameters of Rename File are the old file name and the new file name. The local process 23 renames the file with the old file name to the new file name.

Following renaming of the file at step 208 or following determining that the file is not to be renamed at step 206, the local process 23 Update Event is again called at step 194.

Returning to decision box 180, if the download type is a data processing download, the transfer client 24 executes a local process 23 called Create BLOB. The local process makes a method call to a transfer method 51 operated by the web services server 46. The transfer method 51 is also called Create BLOB. The local process provides the Session ID 83, Profile ID 347, and extract rules 349 as parameters of the method call. In response the web services server 24 will execute its Create Blob Method as discussed with respect to FIG. 16.

Following the Create BLOB method call, the transfer client 24 waits a time interval, at step 192, while the web services server 24 executes its Crate Blob Method. If at decision box 192, the total time elapsed since the Create BLOB method call was made exceeds a threshold, the transfer client effectively aborts the download and proceeds to step 194 where the Update Event function is executed to write a status to the applicable status records of the event parameters table 316 indicating that the event was aborted.

If at decision box 192 the total time elapsed since the Create BLOB method call was made had not exceeded the threshold, the transfer client 24 executes the local Check For Available BLOB function at step 195 (as previously discussed with respect to Step 182). In response, the web services server 46 returns a BLOB ID if a BLOB meeting the criteria is available and not yet downloaded. Presumably the BLOB was created in response to the Create BLOB method call and is now available.

If no BLOB is available, as determined at decision box 196, the transfer client 24 returns to step 190 to again wait for a predetermined time interval.

If a BLOB is available at decision box 196, the transfer client 24 executes the local Download BLOB function at step 198 as previously discussed.

Spawned Upload Process

Figure 27A:
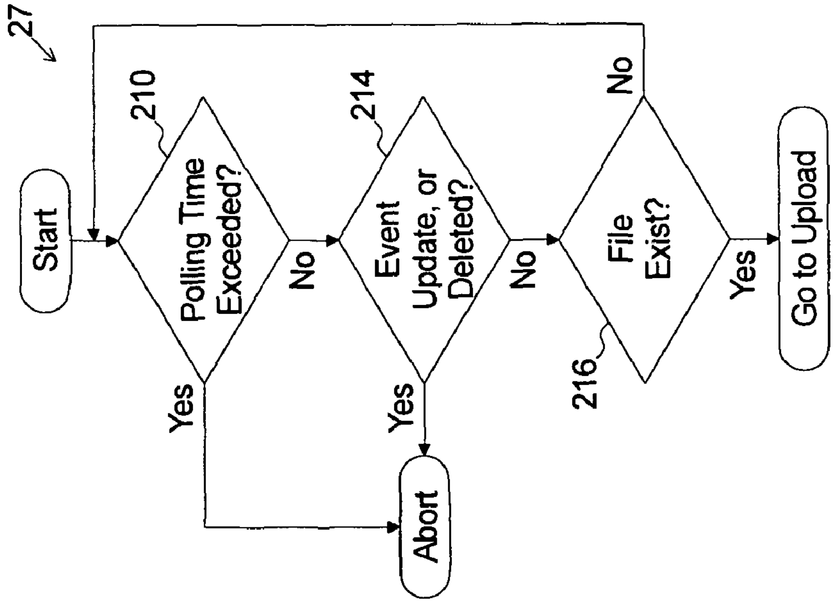
FIG. 27*a* is a flow chart representing an exemplary upload polling process in accordance with one embodiment of the present invention.
Figure 27B:
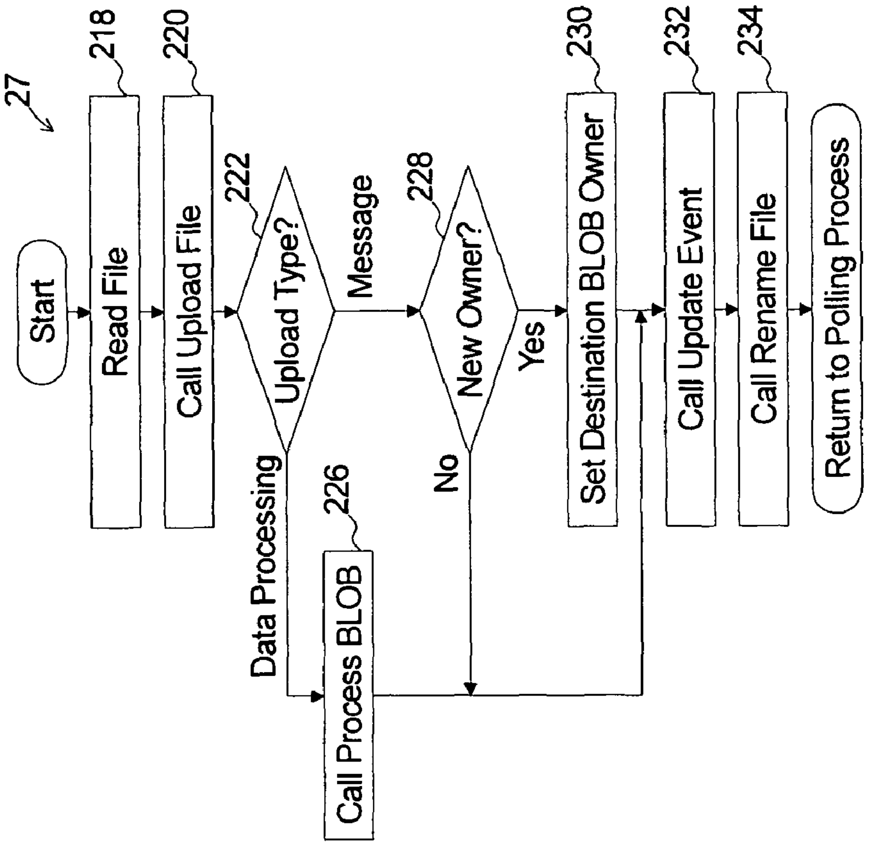
FIG. 27*b* is a flow chart representing an exemplary upload process in accordance with one embodiment of the present invention.

The flow charts of FIGS. 27*a* and 27*b* represents steps of a spawned upload process 27. In the exemplary embodiment, the upload process 27 will continually search the upload directory 50*a* for an applicable file and, if the file is located, proceed to steps which upload the file to the web services server. The flow chart of FIG. 27*a* represents the upload process continually searching (e.g. polling) the upload directory and the flow chart of FIG. 27*b* represents uploading the file to the web services server 46.

Decision box 210 represents determining whether a polling time threshold has been exceeded. The spawned upload process 27 will only continue to search the upload directory 50*a* for a limited period of time referred to as the polling time threshold. If this has been exceeded, the polling process is aborted.

If the polling time threshold has not been exceeded at decision box 210, the polling process determines whether the event has been updated or deleted at step 214. Determining whether the event has been updated or deleted may include making another Read Event method call to the web services server 46 to determine whether event parameters have been changed or the event deleted. If the event has been updated or deleted, the process is aborted polling process aborts. The event, to the extend updated is processes as a "new" event beginning with step 172 of the flow chart of FIG. 25.

If the event has not been updated or deleted, the process determines whether the applicable file (as identified by the file name parameter 323 in the event parameter table 316) exists in the applicable upload directory 50*a* (as identified by the upload directory path parameter 324 in the event parameter table 316) at decision box 216. If the file does not exist, the polling process again returns to decision box 210 to determine whether the polling time threshold has been exceeded. If the file exists at decision box 216, the transfer client 24 begins execution of an upload process as shown in FIG. 27*b*.

Turning to FIG. 27*b*, step 218 represents calling a local process 23 called Read File to obtain the file from the upload directory 50*a* and step 220 represents calling a local process 23 called Upload File. Upload file makes a method call to a transfer method 51 operated by the web services server 46. The transfer method 51 is also called Upload File. The local function provides the Session ID 83 and File Name as parameters of the method call. In response, the web services server 46 executes its Upload File Method as discussed with respect to FIG. 19 to obtain the BLOB, store the BLOB in object storage 317 and create an applicable record in the ownership table 62. The class value 90 is derived from the file name included in the Upload File method call.

Decision box 222 represents determining the upload file process determining the upload file type—which is indicated in a BLOB handling parameter 326 provided at step 170. If the upload file type is data processing, step 226 represents the execution of a local process 23 called Process BLOB. The local process makes a method call to a transfer method 51 operated by the web services server 46. The transfer method 51 is also called Process BLOB. The local process provides the Session ID 83, BLOB ID 89, and loading rules 327 (from the event parameters table 312) as parameters of the method call. In response, the web services server 46 executes its Process BLOB Method as discussed with respect to FIG. 21.

If at decision box 222 the upload type is a message, a determination as to whether a new destination group must be written to the ownership table 62 at step 228. If yes, step 230 represents execution of a local process called Set Destination BLOB Owner. The local process makes a method call to a transfer method 51 operated by the web services server 46. The transfer method 51 is also called Set Destination BLOB Owner. The local process provides the Session ID 83, BLOB ID 89, and destination group ID 325 as parameters of the method call. In response, the web services server 46 executes its Set Destination BLOB Owner Method as discussed with respect to FIG. 20.

Step 232, represents executing the Update Event local function as previously discussed to indicate that the event is complete.

Step 234 represents execution of a local function called Rename File for purposes of renaming and moving the file from the upload directory 50*a* to a unique file name (such as the original file name combined with a time stamp at which the rename occurred) within a processed files directory 52*a*.

Audit Log

FIG. 28 represents an exemplary audit log tables 312 which may include a plurality of audit logs 340*a*-340*c*—one for each transfer client 24. Each audit log 340 comprises a plurality of records 322, each representing a recorded audit event. The fields of the audit log 340 comprise a date field 341, a time field 346, a method called field 348, and a parameters passed field 350.

The date field 341 and the time field 346 establish the date and time at which the record 342 was written to the audit log table 84. The method called field identifies the transfer method 51 that was called and the parameters passed field 350 contains the parameters included in the method call. Each method called is logged in the audit table 312.

Back End Server

In the exemplary embodiment, the back end server application 38 interacts with the web services server in the same manner as the transfer client 24. More specifically, the back end server application 38 may include a transfer client 24 for making method calls to the transfer methods 51 to (as discussed with respect to FIGS. 9 through 21) for obtaining files stored in the object storage 317 by another system and placing objects in the object storage 317 for retrieval by other systems.

Figure 29A:
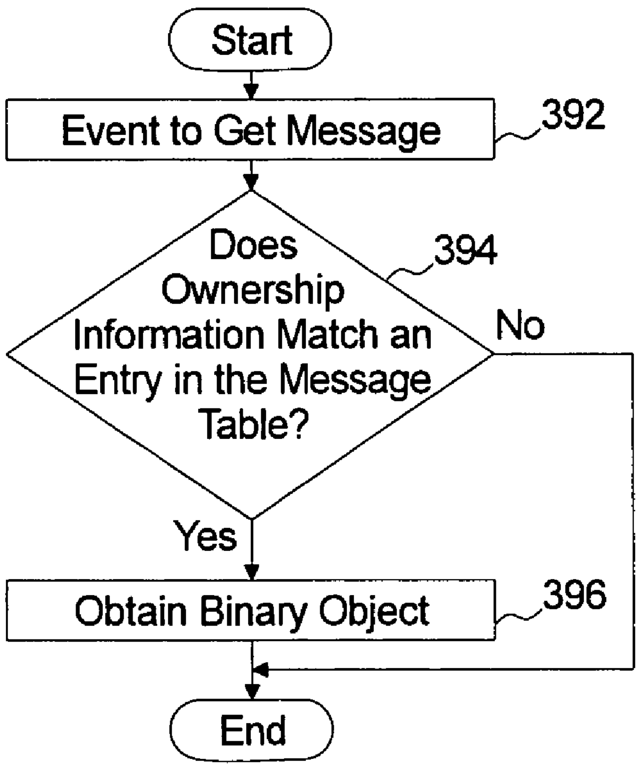
FIGS. 29*a* and 29*b* represent exemplary operation of a back end server application in accordance with one embodiment of the present invention.
Figure 29B:
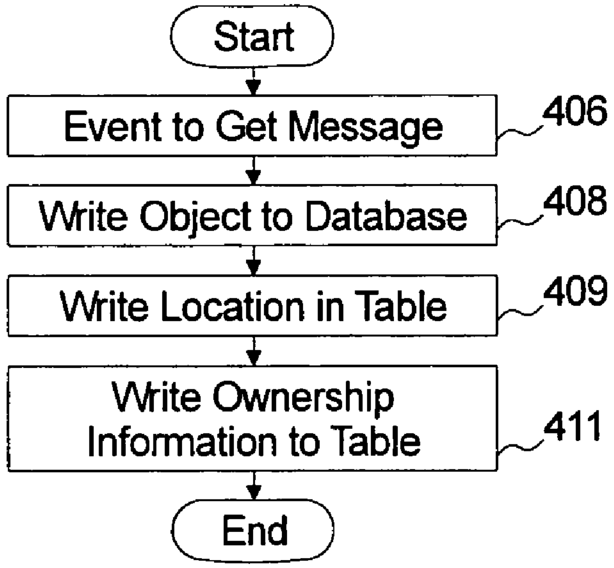

In another embodiment, the back end application server 38 may obtain the object directly from the database 40. FIGS. 29*a* and 29*b* represent operation of the back end server application 38 obtaining object from, and putting objects to, the database 40.

Referring to FIG. 29*a*, step 392 represents the occurrence of an event wherein the back end server application 38 will attempt to obtain a binary object from the object storage 317 of the database 40. Such events may be any events generated internally and applicable to the data processing functions of the back end server application 38.

Step 394 represents accessing the ownership table 62 to determine whether an object with applicable ownership information exists in the object storage 317. If not, there is no object to retrieve. If an object in the object storage 317 matches the ownership information, the back end application server 38 obtains the location of the object form the ownership table 62 and obtains the object at step 396.

Referring to FIG. 29*b*, step 406 represents the occurrence of an event wherein the back end server application 38 will put a binary object into the object storage 317 of the database 40. Again, such events may be any events generated internally and applicable to the data processing functions of the back end server application 38.

Step 408 represents writing the object to the object storage 317 in the database 40. Steps 409 and 411 represent adding a record to the message table 62 and writing the location of the object within the object storage 317 and the ownership information to the newly created record.

It should be appreciated that the above described systems provide for unattended transfer of files over an open network between two unattended application such as the business process application server 18 and either the data processing module 55 of the web services server 46 or the back end application server 38.

It should also be appreciated that such transfer is facilitated by a self installing remote transfer client thereby eliminating the need for cumbersome FTP solutions.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A method for automatically transferring a data file from a network drive of a client controlled local area network to a transfer server over the Internet, the method comprising the steps of:

- using a first workstation coupled to the client controlled local area network to establish a secure connection over the Internet with the transfer server and configure event parameters within event tables of the transfer server;
- storing an unattended interface module on a second workstation coupled to the client controlled local area network, wherein the unattended interface module being executed by a processor of the second workstation to perform the following steps:
  - obtain, from the transfer server, the event parameters stored in the event tables, the event parameters comprising:
    - a file name, the file name identifying the name of the data file to be uploaded; and
    - a directory path, the directory path identifying an upload directory of the network drive of the client controlled local area network;
  - periodically searching the upload directory and, upon locating a data file in the upload directory with the file name, transferring the data file to the transfer server over a secure connection established with the transfer server over the internet.

2. A method as claimed in claim 1, wherein the step of transferring the data file to the transfer server comprises:

- establishing the secure connection to the transfer server over the network;
- authenticating the unattended interface module to the transfer server utilizing a ID number and password; and only transferring the data file to the transfer server if the unattended interface module is authenticated.

3. A method as claimed in claim 1, wherein the step of obtaining the event parameters from the transfer server comprises:

establishing the secure connection to the transfer server over the network;

authenticating the unattended interface module to the transfer server utilizing a ID number and password; and only obtaining event parameters from the transfer server if the unattended interface module is authenticated.

4. A system for automatically transferring a data file from a network drive of a client controlled local area network to a transfer server over the internet, the system comprising:

a business process system coupled to the client controlled local area network and storing the data file in an upload directory location on the network drive;

a first workstation coupled to the client controlled local area network, establishing a secure connection over the internet with the transfer server, and configuring event parameters within event tables of the transfer server;

a second workstation coupled to the client controlled local area network, the second workstation comprising an unattended interface module adapted to:

obtain, from the transfer server, the event parameters stored in the event tables, the event parameters comprising:

a file name, the file name identifying the name of the data file to be uploaded; and a directory path, the directory path identifying the upload directory location of the network drive of the client controlled local area network;

periodically searching the upload directory location for the data file stored by the business process system with the identified name of the data file to be uploaded and, upon locating the data file:

establishing a secure connection to the transfer server over the internet; and transferring the data file to the transfer server over the secure connection.

5. A system as claimed in claim 4, wherein transferring the data file to the transfer server comprises:

establishing the secure connection to the transfer server over the network;

authenticating the unattended interface module to the transfer server utilizing a ID number and password; and only transferring the data file to the transfer server if the unattended interface module is authenticated.

6. A system as claimed in claim 4, wherein obtaining a loading configuration from the transfer server comprises:

establishing the secure connection to the transfer server over the network;

authenticating the unattended interface module to the transfer server utilizing a ID number and password; and only obtaining the loading configuration from the transfer server if the unattended interface module is authenticated.

* * * * *